United States Patent [19]
Stefanini

[11] Patent Number: 5,935,433
[45] Date of Patent: *Aug. 10, 1999

[54] ARRANGEMENT FOR AND METHOD OF TREATING FLUID

[76] Inventor: Daniel Stefanini, Manor House, 27 Private Rd., Sherwood, Nottingham NG5 4DD, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,966

[22] Filed: Oct. 24, 1997

Related U.S. Application Data

[60] Continuation of application No. 08/589,349, Jan. 22, 1996, abandoned, which is a division of application No. 08/140,766, Oct. 21, 1993, Pat. No. 5,514,283, which is a continuation-in-part of application No. 07/838,291, Mar. 5, 1992, abandoned.

[30] Foreign Application Priority Data

| Jul. 11, 1990 | [GB] | United Kingdom | 9015224 |
| Aug. 7, 1991 | [WO] | WIPO | PCT/GB91/01119 |
| Sep. 25, 1993 | [GB] | United Kingdom | 9319859 |

[51] Int. Cl.$^6$ .................................................. C02F 1/48
[52] U.S. Cl. ........................................................ 210/222
[58] Field of Search ........................ 336/82, 175, 186, 336/206, 223, 62, 174, 195; 210/222, 695

[56] References Cited

U.S. PATENT DOCUMENTS

| 847,008 | 3/1907 | Kitsee | 336/170 |
| 1,857,215 | 5/1932 | Ruder | 336/175 |
| 2,405,137 | 8/1946 | Gale et al. | 210/222 |
| 2,607,492 | 8/1952 | Anders | 210/222 |
| 2,939,830 | 6/1960 | Green et al. | 210/222 |
| 3,368,137 | 2/1968 | Kennard et al. | 336/175 |
| 3,819,515 | 6/1974 | Allen | 210/42 |
| 4,455,228 | 6/1984 | Jones | 210/222 |
| 4,892,655 | 1/1990 | Makovec | 210/222 |
| 4,975,671 | 12/1990 | Dirks | 336/65 |
| 5,122,269 | 6/1992 | De Reuver | 210/222 |
| 5,161,098 | 11/1992 | Balakrishnan | 363/144 |

FOREIGN PATENT DOCUMENTS

| 274231 | 1/1965 | Australia | 210/222 |
| 53806 | 3/1983 | Japan . | |
| 49044 | 11/1984 | Japan | 210/222 |
| 6-3171692 | 7/1988 | Japan | 210/222 |
| 965472 | 10/1982 | U.S.S.R. | 210/222 |
| 92006042 | 4/1992 | United Kingdom | 210/222 |

*Primary Examiner*—Michael L. Gellner
*Attorney, Agent, or Firm*—Kirschstein, et al.

[57] ABSTRACT

An arrangement for, and a method of, treating fluids, e.g., conditioning water in a pipe to resist scale deposits from building up in the pipe, comprise a primary coil mounted exteriorly of the pipe, and an electronic circuit for energizing the primary coil to generate a succession of radio frequency signals that form an electromagnetic field in the water. The field has generally circular flux lines in generally co-axial relation with the pipe, and is propagated along the entire pipe.

10 Claims, 8 Drawing Sheets

ARRANGEMENT FOR AND METHOD OF TREATING FLUID

CROSS REFERENCE TO RELATED APPLICATION

This application is a continuation of U.S. Ser. No. 08/589,349, filed Jan. 22, 1996, now abandoned, which, is a division of U.S. Ser. No. 08/140,766, filed Oct. 21, 1993, now U.S. Pat. No. 5,514,283, which, in turn, is a continuation-in-part of U.S. Ser. No. 07/838,291, filed Mar. 5, 1992, now abandoned.

BACKGROUND OF THE INVENTION

1. Field of the Invention

This invention generally relates to an arrangement for, and a method of, treating a fluid and, more particularly, to condition water, to resist scale deposits from building up in a water-carrying conduit and, still more particularly, to the generation of an electromagnetic field having generally circular flux lines for treating a fluid.

2. Description of the Related Art

Impurities, such as calcium and magnesium ions, in water, form scale which, over time, adheres to the interior walls of water pipes. Heated water accelerates the formation of scale and, hence, steam boilers are particularly susceptible to scale build-up and to reduced heat transmission, higher fuel usage and even local overheating. In domestic plumbing systems, calcium and magnesium ions react with soap to resist the formation of suds, thereby preventing effective cleaning.

Many water treatment descaling systems have heretofore been proposed to condition water to resist such scale formation and build-up. For example, chemical solutions have been introduced into water pipes. Such chemical solutions require constant replenishment and also adulterate the water. Another approach is to position erodible electrodes into the water. However, as the electrodes erode, they lose their effectiveness and, ultimately, also need replacement.

Still another approach positions magnets in direct contact with the water. However, such magnets can only collect magnetic debris and, eventually, the build-up of debris can occlude the pipe.

Yet another approach uses magnetic or electromagnetic fields, both exteriorly and interiorly of a piping system. However, such fields are local in action and, in any event, rely on the flow of water to transport the descaling effect to downstream areas of the water pipes.

OBJECTS OF THE INVENTION

It is a general object of this invention to advance the state of the art of treating fluids, for example, water conditioning descaling systems.

Another object of this invention is to provide an improved arrangement for and a method of inhibiting the formation of scale in water pipes.

Another object of this invention is to eliminate the use of chemicals, electrodes, magnets or any similar descaling device mounted interiorly of water pipes.

An additional object of this invention is to increase the descaling effectiveness of a conditioning system using electromagnetic fields.

Another object of this invention is to provide effective descaling action throughout a water piping system, even when the water is not flowing therein.

Still another object of this invention is to treat various fluids, not necessarily water, to achieve beneficial effects.

SUMMARY OF THE INVENTION

In keeping with these objects and others which will become apparent hereinafter, one feature of this invention resides, briefly stated, in an arrangement for, and a method of, treating a fluid contained in a conduit extending along an axis. The arrangement comprises a primary coil mounted exteriorly of the conduit; means for energizing the primary coil to generate a succession of radio frequency signals; and means responsive to the generation of the radio frequency signals, for generating in the fluid to be treated an electromagnetic field having generally circular flux lines in generally co-axial relation with the axis of the conduit, and for propagating the field along the axis to treat the fluid both upstream and downstream of the primary coil.

In accordance with one application of this invention, wherein the fluid is water, and it is desired to treat the water to resist scale deposits, the propagation of the electromagnetic field with the generally circular flux lines provides a very thorough descaling action. No chemicals, electrodes, magnets or other descaling device is mounted within the conduit. The descaling action is not local in effect but, instead, is propagated throughout the conduit even when the fluid is not flowing.

According to a preferred embodiment of this invention, the primary coil is a primary winding of electrical wire to which the energizing means is connected. The generating means includes a secondary winding of electrical wire. A ferrite core is provided between the windings. The secondary winding has a pair of axially spaced-apart terminals.

The arrangement further comprises a housing in which the windings are mounted. The terminals are exteriorly mounted on the housing. A holder holds the housing on the conduit with the terminals in electrical contact at axially spaced-apart contact zones on the conduit.

A conductive path extends along the conduit between the contact zones. The conductive path has a low impedance for the radio frequency signals. If the conduit is made of metal, a conductive path is automatically established. If the conduit is constituted of a synthetic plastic material, then a metal foil is wound about the conduit between the contact zones in order to provide said low impedance path.

According to another embodiment of the invention, the primary coil is a primary winding of electrical wire, and a ferrite core is coiled co-axially or spirally around the conduit in a manner so as to extend through the primary winding. For example, the primary winding may be a multi-wire ribbon cable having a pin connector and a socket connector at opposite ends of the cable. The pin connector has a row of pins, and the socket has a row of sockets. The connectors are interconnected to form a loop with the rows offset by one pin.

In another embodiment, the primary coil includes a dual-in-line package having a row of pins, and a printed circuit board having a row of sockets. The package is mounted on the board with the rows offset by one pin. A ferrite core extends through the primary coil and is coiled co-axially around the conduit.

The energizing means includes means, e.g., a microphone, for detecting the sound of fluid flowing along the conduit, and for generating an analog audio signal having a frequency proportional to the detected sound. The microphone, in effect, detects the turbulence in the water which causes the sound to be generated.

The energizing means further includes a filter for removing noise from the audio signal, a transducer for converting the audio signal into a series of digital pulses whose frequency is propor-tional to the frequency of the audio signal, a converter for converting the digital pulses to a DC voltage whose amplitude is proportional to the frequency of the audio signal, and another transducer for changing the DC voltage to a train of drive pulses applied to the primary coil. In turn, the primary coil causes the succession of radio frequency signals to be generated.

Each radio frequency signal has a frequency in a range from 200 to 500 KHz. Each radio frequency signal has a sinusoidally variable amplitude which diminishes from a maximum value to zero. Preferably, the signals have random wait states.

The electromagnetic field is automatically produced and is directly proportional to the condition of the piping system, and especially to the amount of scale therein. The arrangement is preferably never turned off, thereby ensuring a minimum treatment level. The treatment is maintained whether the water flows or not, which is of particular benefit in domestic installations where water flow is intermittent.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
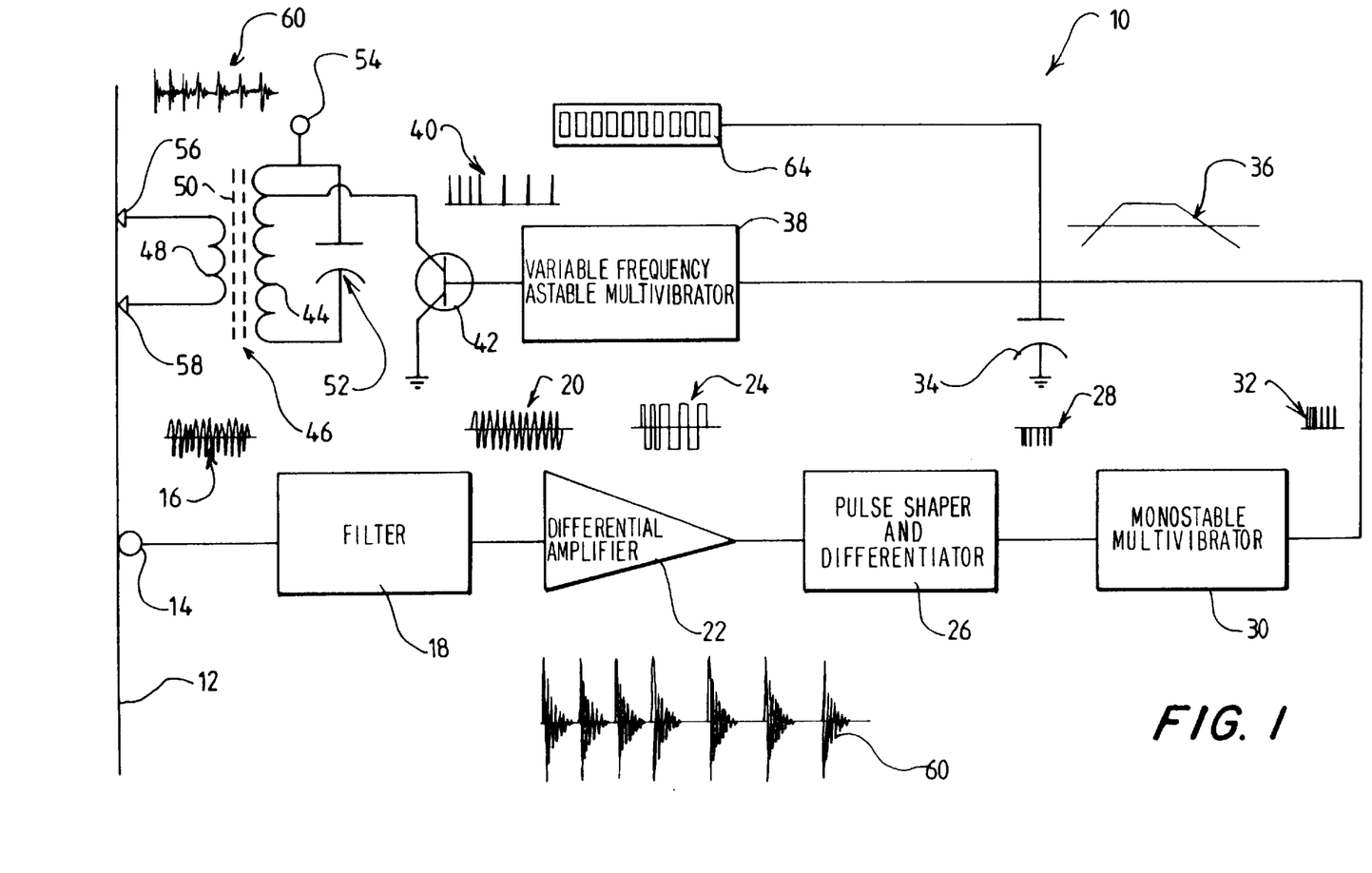
FIG. 1 is an electronic circuit diagram of an arrangement in accordance with one embodiment of this invention.

Referring now to the drawings, reference numeral 10 in FIG. 1 generally identifies an arrangement for, and a method of, treating a fluid, e.g., water, contained in a conduit or water pipe 12 (shown in broken-away view) for the purpose of resisting and inhibiting the deposit of scale on the inner walls of the pipe 12, as well as for reversing the deposit of scale in a pipe where scale has already built up.

In accordance with one preferred embodiment, a turbulence detector or microphone 14 is positioned in physical contact with the pipe, and is operative for detecting a sound that is generated as a result of turbulence inside the pipe. Such turbulence is generated as water passes through the pipe, especially when the water passes over lime scale deposits. An analog audio signal 16 is generated and has a frequency directly proportional to the amount of turbulence detected. The frequency lies in a range from 20 through 20,000 Hz.

A filter 18 is operative to remove noise from the audio signal 16, thereby filtering out sounds not associated with the turbulence of the water passing through the pipe. The filtered signal 20 is shown in FIG. 1.

A differential amplifier 22 processes and amplifies the filtered signal 20 in preparation for pulse shaping. The amplification has a gain, preferably adjustable, which is set sufficiently high to saturate the filtered signal 20 and convert the same to a saturated, squared signal 24.

A pulse shaping and differentiating network 26 processes the squared signal 24 to a series of pulses 28 of limited pulse widths. The frequency of the audio signal 16 is thus converted into a corresponding number of pulses.

A monostable multivibrator 30 expands the pulses 28 of limited width into a series of wider, digital pulses 32. A frequency to voltage converter, also known as an averager, preferably embodied by a capacitor 34, converts the wider pulses 32 to a DC voltage 36 whose amplitude is a function of the frequency of the wider pulses 32 and, hence, of the frequency of the audio signal. A voltage to pulse train converter or variable frequency astable multivibrator 38 converts the DC voltage 36 to a variable frequency train of pulses 40 whose frequency is also directly proportional to that of the audio signal. A power output transistor 42 converts the train of pulses 40 to a series of drive pulses that are conducted to a primary winding 44 of a high frequency output transformer 46 having a secondary winding 48 and an adjustable ferrite core 50 between the windings. Primary winding 44 is a tuned winding and is connected in series with a capacitor 52 and a DC supply voltage 54. The secondary winding 48 has a pair of spaced-apart terminals 56, 58 which, as described below, is placed into physical contact with the pipe 12 at a pair of contact zones spaced-apart lengthwise along the axis of the pipe.

The transformer 46 converts the drive pulses into a series of radio frequency ringing signals 60, each having a frequency in a range from 200 to 500 KHz and has a generally sinusoidally varying amplitude diminishing from a maximum value to zero. The intervals between the ringing signals are not equal in duration, thereby providing a random wait state between the signals.

Figure 4A:
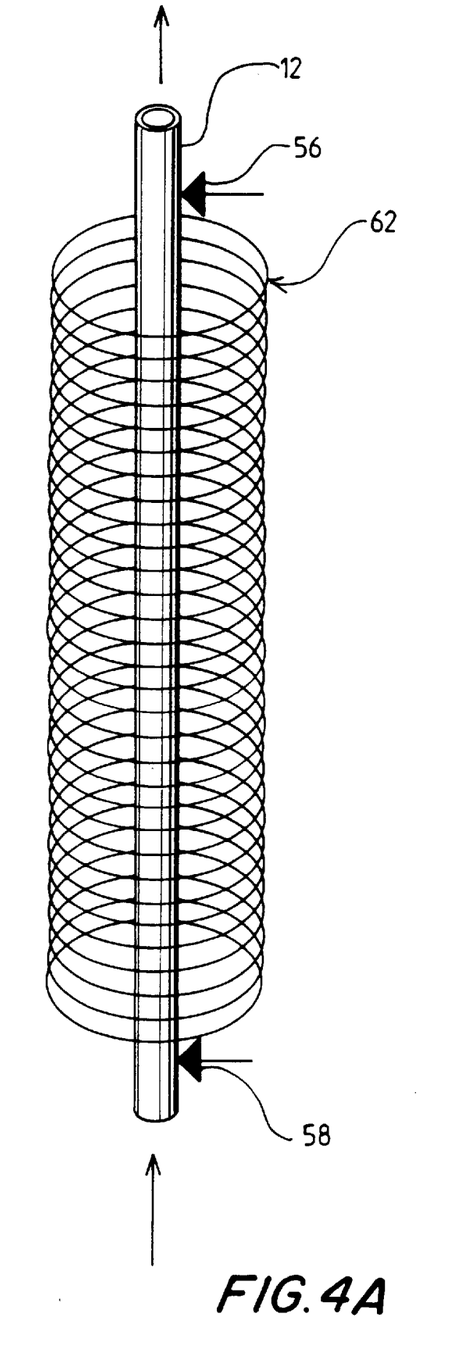
FIG. 4A is a perspective view of magnetic flux lines generated in accordance with the arrangement of FIG. 1 and surrounding the conduit.
Figure 4B:
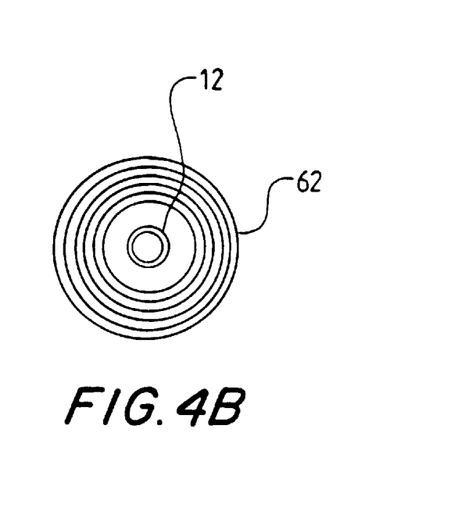
FIG. 4B is a cross-sectional view of FIG. 4A away from the contact zones.

When the pipe is constituted of a conductive material, e.g., copper, the transformer 46 constitutes a low impedance source which is operative to generate a low voltage, high current signal between the terminals 56, 58. This high current travels along the pipe axis and generates an electromagnetic field (see FIGS. 4A, 4B) having generally circular magnetic lines of flux 62 in generally co-axial relation with the axis of the conduit. Between the terminals 56 and 58, the flux lines are co-axial with an imaginary line extending through the contact zones on the exterior of the pipe 12, since the pipe has a non-negligible diameter. The electromagnetic field shown in FIGS. 4A, 4B is shown for one instant of time, it being understood that this field expands and collapses as the amplitude of each ringing signal changes. The radio frequency electromagnetic field propagates along the conduit in both directions both upstream and downstream of the contact zones and generates a descaling action on the water through the piping installation.

It has been observed that in the case of calcium carbonate scale, shorter wait states between the ringing signals reduces the time to occlusion of the conduit, whereas longer wait states increase the time to occlusion. Also, different temperatures and different wait states affect the occlusion rate.

When the pipe is constituted of a non-conductive material, e.g., plastic, the same descaling action can be achieved by wrapping the section of the pipe between the contact zones with copper foil.

A power level indicator 64 serves as a visual display means, and is connected to the averager capacitor 34. The indicator 64 preferably constitutes of a series of light emitting diodes arranged in a row, the number of diodes lit at any one time being indicative of the level of output power.

Figure 2:
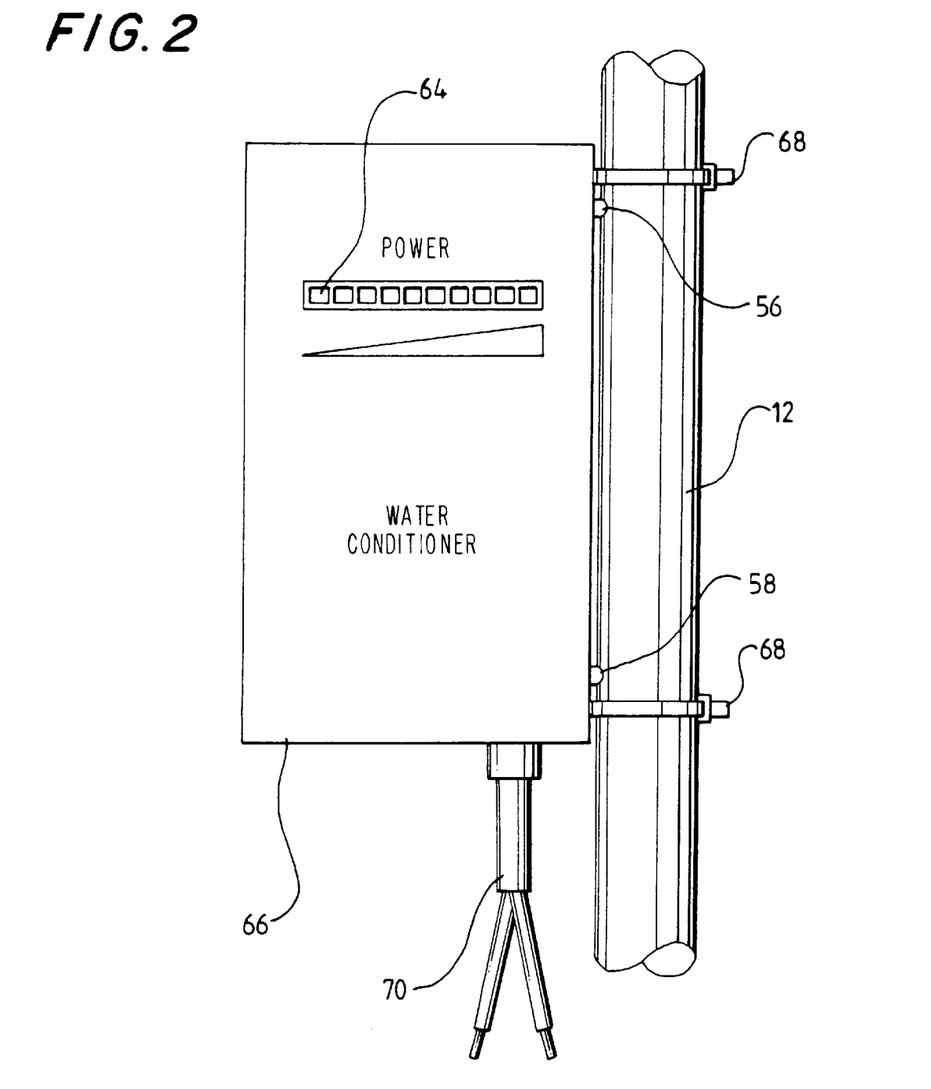
FIG. 2 is a front elevational view of the arrangement of FIG. 1 mounted on a conduit.
Figure 3:
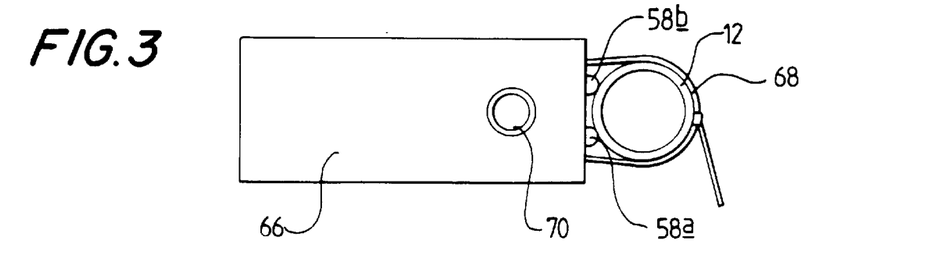
FIG. 3 is a bottom end view of FIG. 2.

As shown in FIG. 2, the arrangement 10 is housed in a housing 66 connected by plastic ties or holders 68 to the pipe. The terminals 56, 58 are externally located on the housing and are pressed into electromechanical contact with the pipe when the housing is held thereon. The microphone is located within the housing, together with all the other components depicted in FIG. 1. The display 64 is also exteriorly located on the housing for easy viewing. Electrical power is supplied to the housing via cable 70. Each of the aforementioned terminals 56, 58 is preferably comprised of a pair of terminal portions (see 58a, 58b in FIG. 3) on both of which the pipe 12 rests to resist accidental slippage from the pipe. External controls on the housing may be employed to manually adjust interior components.

Figure 5:
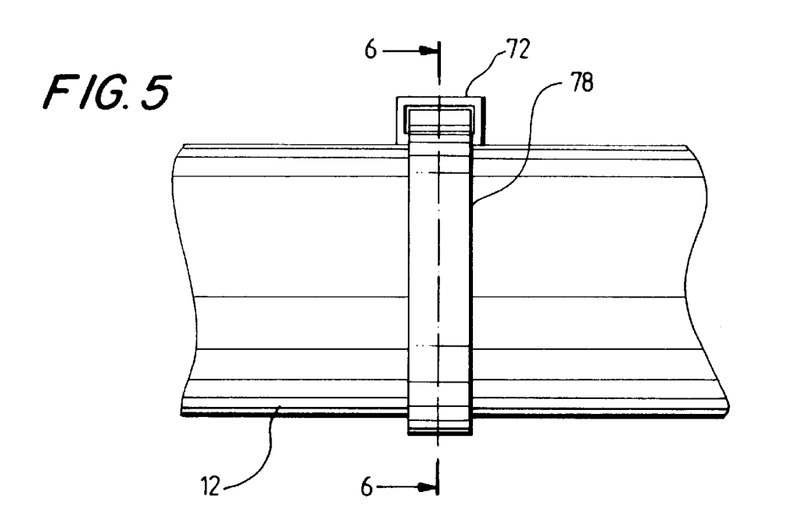
FIG. 5 is a broken-away elevational view of a modified embodiment in accordance with this invention.
Figure 6:
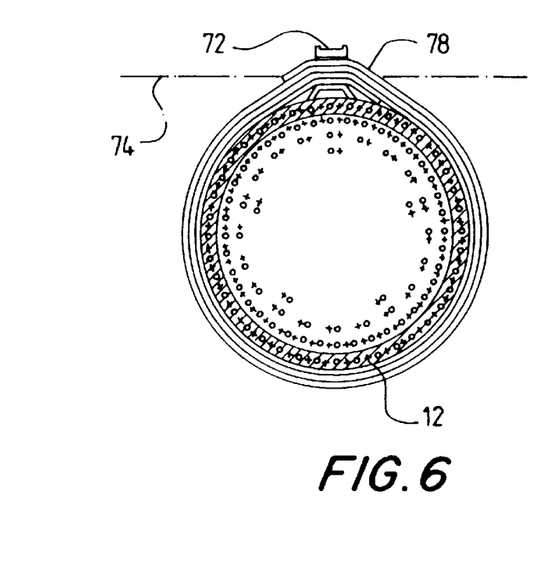
FIG. 6 is a sectional view taken along line 6—6 of FIG. 5.
Figure 7:
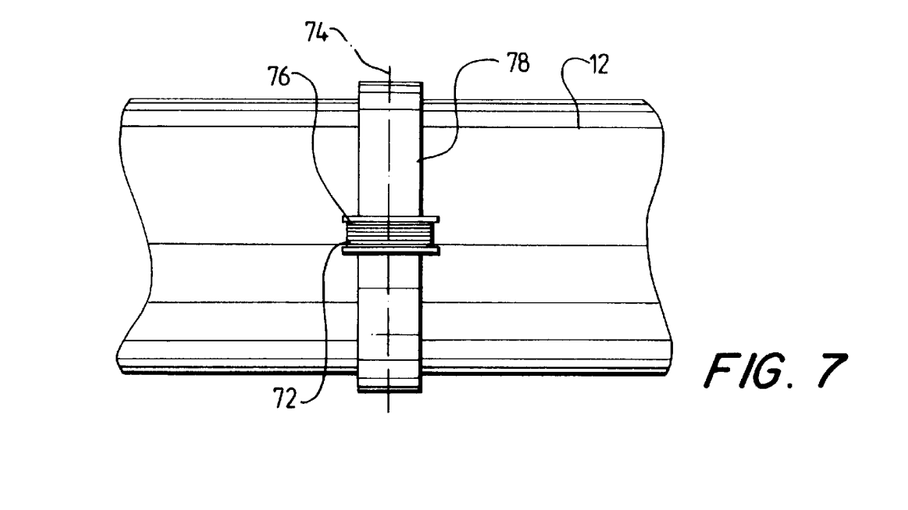
FIG. 7 is a top plan view of the modification of FIG. 5.

Turning to FIGS. 5 through 7, rather than using a transformer having a secondary winding, the same electromagnetic field can be achieved in a more efficient manner with a novel device operative to make the pipe itself and/or the water therein serve as the secondary winding. A primary winding 72 of electrical wire is coiled in a loop about a first axis 74 (see FIG. 7). Each coil of the primary winding 72 lies in a plane extending lengthwise along the axis of the pipe 12. The primary winding is mounted on a spool 76 mounted exteriorly of the pipe. A ferrite core 78 is coiled spirally around the pipe about the pipe axis. The ferrite core 78 extends through each coil of the primary winding 72. The ferrite core can consist of a number of rigid links or, as shown, as a flexible strip similar to the type used in strip magnets on refrigerator doors. This arrangement forms a torroidal transformer in which the pipe itself is the secondary winding of the transfor-mer. The torroidal transformer is more efficient than the lower efficiency transformer 46 described in connection with FIG. 1, and is of special benefit on large diameter pipes. The torroidal transformer has a larger primary to secondary ratio which matches the impedance of the source directly to the pipe.

The direction and current concentration of the AC current generated in the pipe and in the water is depicted in FIG. 6. The circle with the dot and the + sign respectively represent the direction of the AC current flowing toward and away from the viewer. The AC current is uniformly distributed and concentrated around the periphery of the pipe due to the well-known "skin effect." It will be noted that the pipe does not have to be constituted of a metal material, nor need plastic pipe be wrapped with metal foil, as described above, because in the arrangement of FIGS. 5 through 7, the liquid itself acts as a conductor and secondary coil of the torroidal transformer. No contact points are required along the pipe to ensure a more reliable operation over long periods of time without the need for maintenance.

Figure 8:
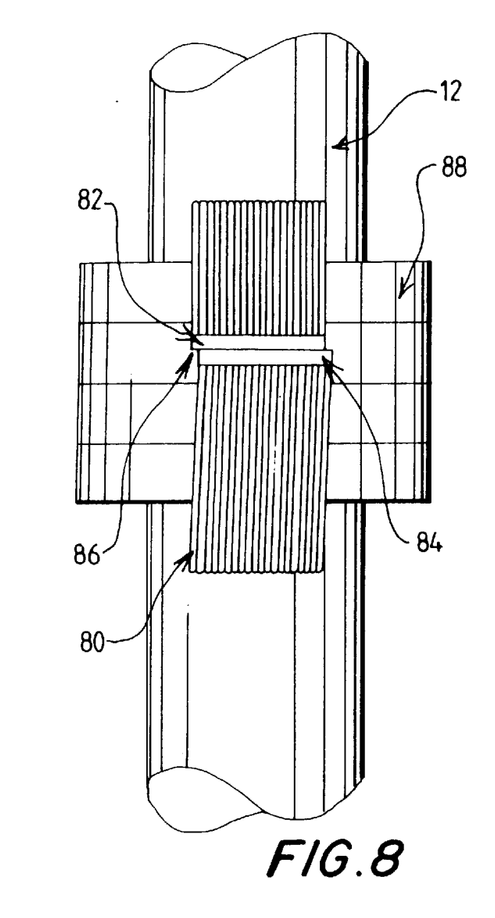
FIG. 8 is a top plan view of still another modified embodiment in accordance with this invention.
Figure 9:
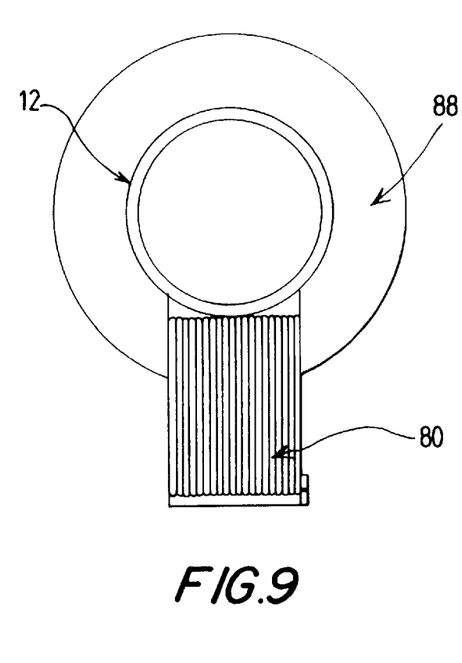
FIG. 9 is an end view of the modification of FIG. 8.
Figure 10:
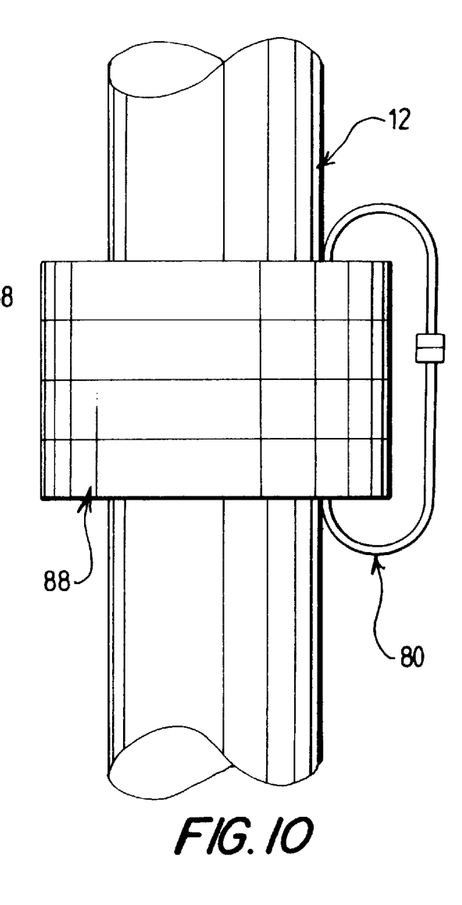
FIG. 10 is a side elevational view of the modification of FIG. 8.

Another way of making the primary winding is to use a multi-wire ribbon cable 80 depicted in FIGS. 8 through 10. Cable 80 has a pin connector 82 and a socket connector 84 at opposite ends of the cable. Pin connector 82 has a row of pins projecting there-from; and socket connector 84 has a row of sockets formed therein. The number of pins and sockets correspond to the number of indivi-dual conductors within the cable.

In order to form a continuous coil out of the individual conductors in the cable 80, the pin and socket connectors are interconnected, with one pin 86 (see FIG. 8) offset. In other words, the second pin in the row is connected to the first socket, the third pin in the row is connected to the second socket, and so on. The first pin 86 and the last socket are left unconnected, thereby forming a continuous loop when the connectors are so interconnected.

Otherwise, a ferrite core 88 is, as described above, coiled about pipe 12 and is routed through the cable 80. Again, the pipe itself and/or the water therein serve as the secondary winding for the torroidal transformer.

Figure 11:
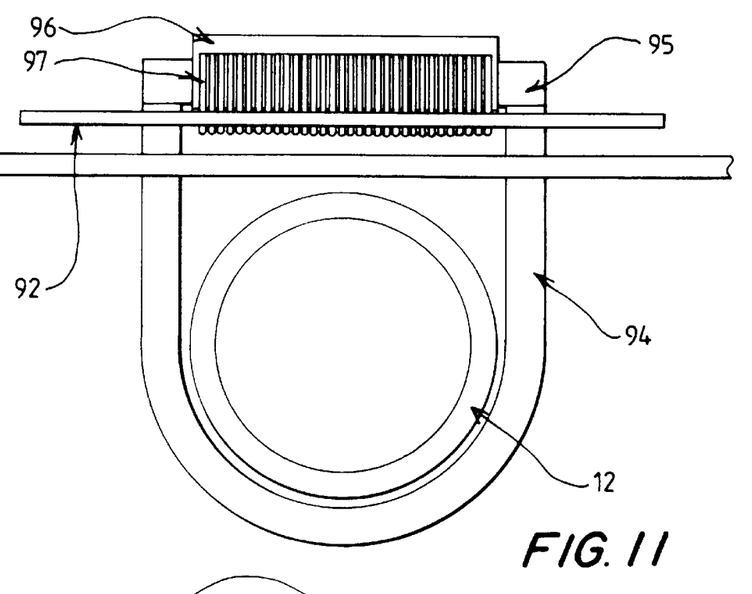
FIG. 11 is a sectional view of yet another modified embodiment in accordance with this invention.
Figure 12:
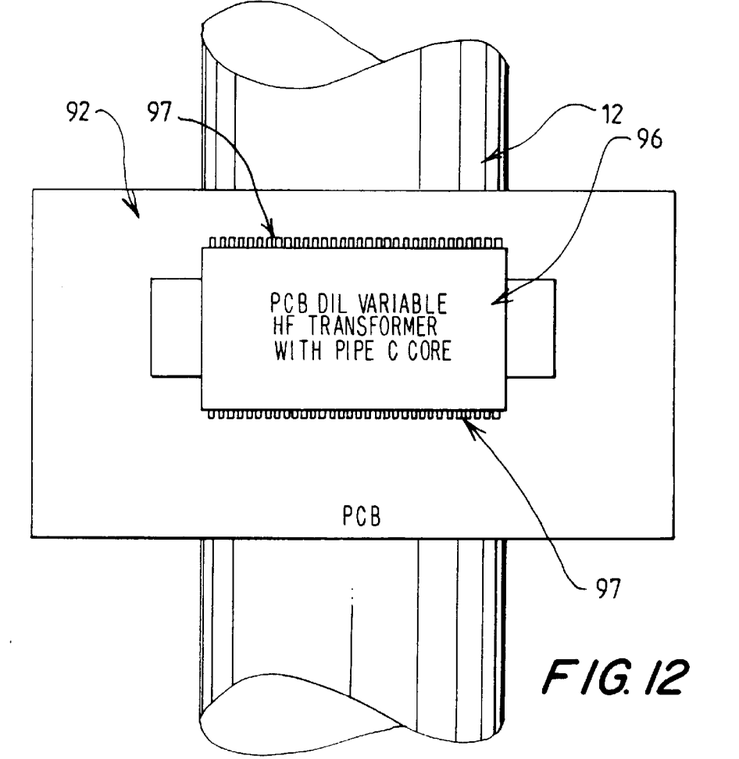
FIG. 12 is a top plan view of the modification of FIG. 11.

Still another way of making the primary winding is, as shown in FIGS. 11 and 12, to use a dual in-line package 96 having two rows of pins 97 extending from opposite sides of the package, as well as a printed circuit board 92 having corresponding rows of sockets therein for receiving the pins. A generally U-shaped ferrite core 94 extends around the underside of the conduit 12, through the board and continues along core section 95 between the package 96 and the board 92. As before, the package is mounted on the board with the rows offset so that one pin of each row of the package is offset from the corresponding row of sockets, thereby forming a continuous loop. The pipe itself and/or the water therein serves as the secondary winding of the transformer thus formed.

Figure 13:
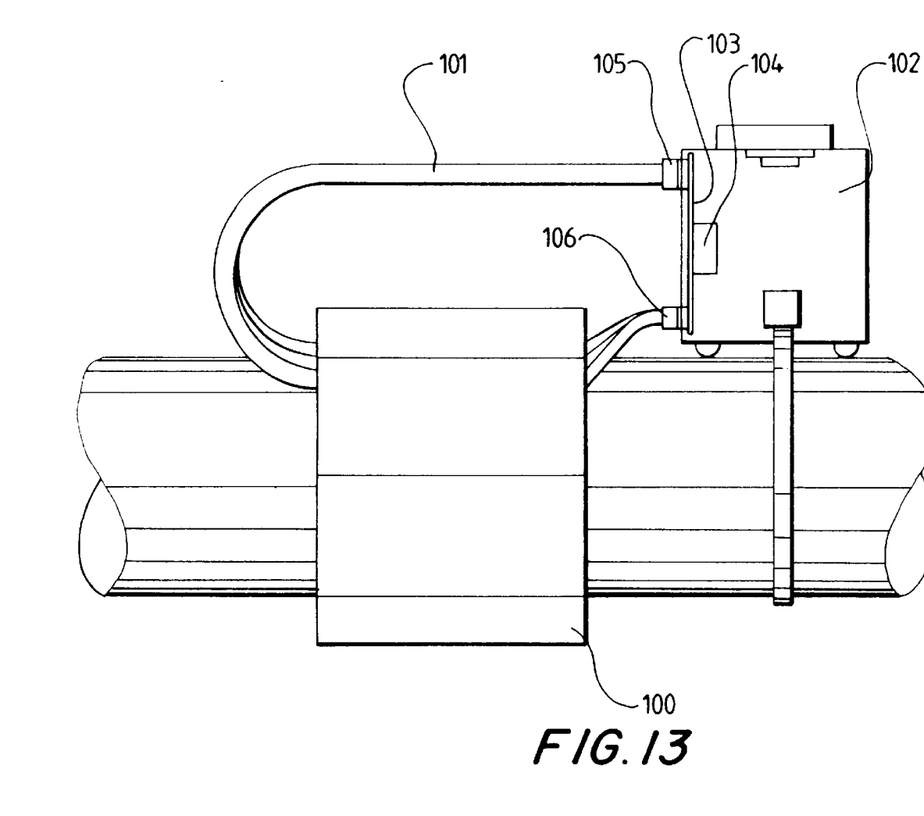
FIG. 13 is a side elevational view of still another modified embodiment in accordance with this invention.
Figure 14:
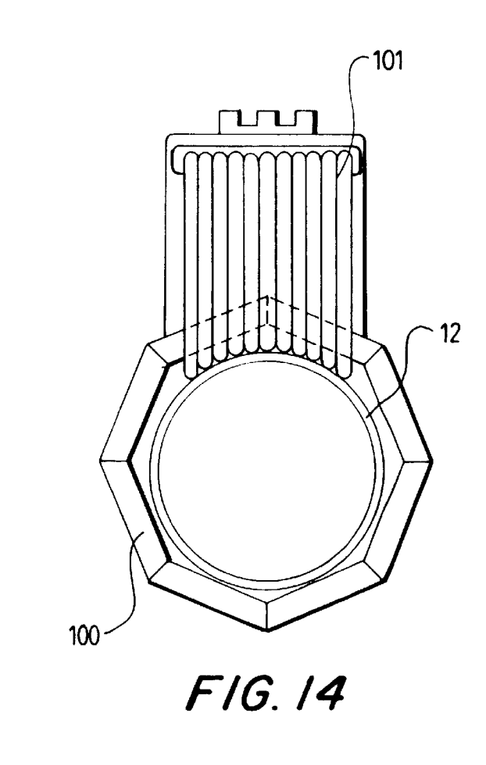
FIG. 14 is an end view of the modification of FIG. 13.

As shown in FIGS. 13 and 14, a ferrite core 100 surrounds the pipe 12. A plurality of cables 101 are routed between the pipe and the core 100. Opposite cable ends 105, 106 are connected to a housing 102 mounted to the pipe in a similar manner to that shown in FIG. 2. A dual-in-line package 104 and printed circuit board 103, analogous to package 96 and board 92, are shown.

Figure 15:
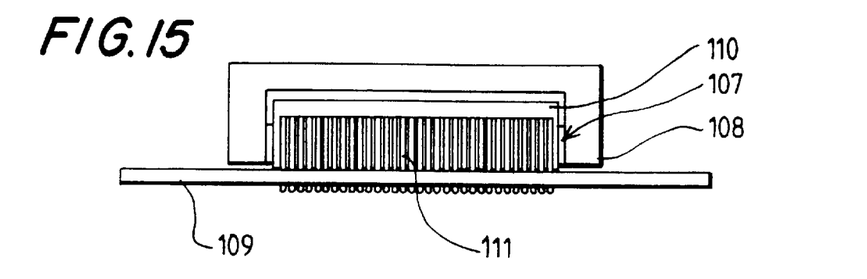
FIG. 15 is a side elevational view of a component for use in accordance with this invention.
Figure 16:
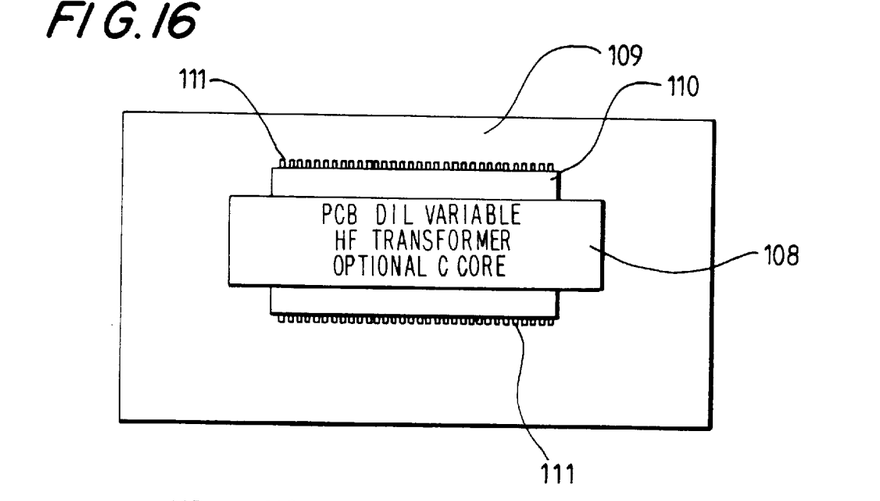
FIG. 16 is a top plan view of the component of FIG. 15.

FIG. 15 depicts another dual-in-line package 110, similar to package 96. Package 110 has two rows of pins 111, a permanent ferrite core 107, and an optional C-shaped core 108. Package 110 is mounted on a printed circuit board 109. Pins 111 are mounted in corresponding sockets on the board, with the rows offset from the sockets as previously described in connection with FIGS. 11 and 12.

Figure 17:
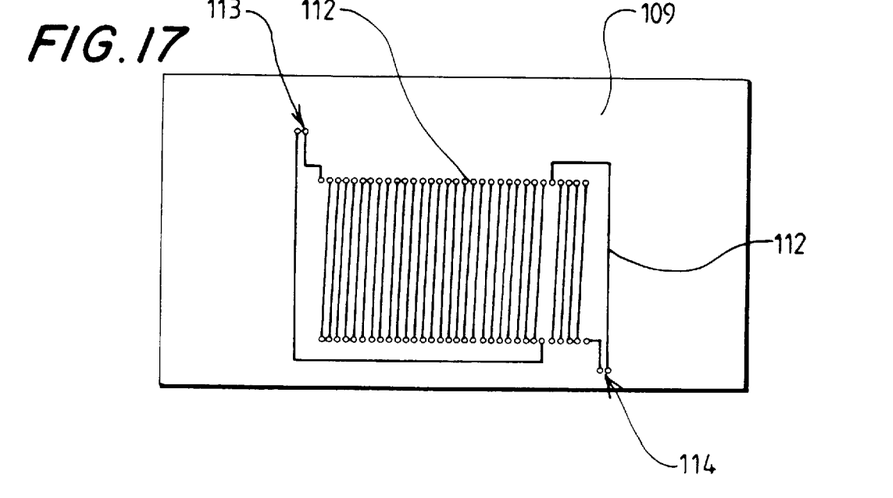
FIG. 17 is a bottom plan view of the component of FIG. 15.

The pins 111 are part of a U-shaped winding which is completed by conductive tracks 112 shown on the underside of the board 109 in FIG. 17. The ratio between the primary coil 112 and the secondary coil 114 can be adjusted. Tap points can be added where desired.

The conditioner is especially useful for treating water in domestic or commercial water supply systems or heating systems and can be beneficially used in water treatment stations or swimming pools. The conditioner need not be restricted to treating water, but can also treat beer in barrels, sewage in settling tanks, wine in fermenting vessels, fuel in fuel tanks and, in short, any fluid having ions or fine suspended solids therein.

It will be understood that each of the elements described above, or two or more together, also may find a useful application in other types of constructions differing from the types described above.

While the invention has been illustrated and described as embodied in arrangement for and method of conditioning water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In an apparatus for generating and propagating an electromagnetic field, an arrangement comprising:
   a) an elongated conduit extending along a conduit axis and containing a fluid to be treated by exposure to the electromagnetic field for resisting scale deposition inside the conduit;
   b) a plurality of electrical wire loops mounted exteriorly of the conduit, and extending around a first axis that extends generally perpendicular to the conduit axis;
   c) a ferrite core exteriorly mounted completely around the conduit in a continuous magnetic loop about the conduit axis and extending through the loops; and
   d) an alternating current source electrically connected to the wire loops to generate the electromagnetic field circumferentially of the conduit axis, and to generate and propagate an alternating current coaxially of the conduit axis.

2. The arrangement according to claim 1, wherein the ferrite core is coiled spirally around the conduit.

3. The arrangement according to claim 1, wherein the ferrite core consists of a flexible strip.

4. The arrangement according to claim 1, wherein the ferrite core consists of a plurality of rigid links.

5. The arrangement according to claim 1, wherein the ferrite core engages the wire loops and the conduit.

6. The arrangement according to claim 1, wherein the ferrite core includes a U-shape core portion having opposite ends spaced apart of each other, and a linear core portion extending between the ends through the loops.

7. The arrangement according to claim 1, wherein the electrical wire loops include a plurality of cables each having opposite cable ends connected to a housing mounted exteriorly of the conduit.

8. The arrangement according to claim 1, wherein the electrical wire loops include a multi-wire ribbon cable having a pin connector and a socket connector at opposite ends of the cable, said pin connector having a row of pins, and said socket connector having a row of sockets, and wherein the connectors are interconnected to form the loops with the rows offset by one pin.

9. The arrangement according to claim 1, wherein the electrical wire loops include a dual-in-line package having a row of pins, and a printed circuit board having a row of sockets, and wherein the package is mounted on the board with the rows offset by one pin to form the loops.

10. The arrangement according to claim 9, wherein the board has conductive traces thereon.

* * * * *